(12) United States Patent
Kühne et al.

(10) Patent No.: US 11,833,995 B2
(45) Date of Patent: Dec. 5, 2023

(54) FORCE TRANSMISSION ELEMENT FOR A DEVICE FOR BELT TENSIONING AND A DEVICE FOR BELT TENSIONING WITH SUCH A FORCE TRANSMISSION ELEMENT

(71) Applicant: ILLINOIS TOOL WORKS INC., Glenview, IL (US)

(72) Inventors: David Kühne, Burgdorf (DE); Christian Engel, Ahlden (DE); Eyüp Aslan, Hannover (DE); Jose Luis Serrada, Brunswick (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 247 days.

(21) Appl. No.: 17/329,367

(22) Filed: May 25, 2021

(65) Prior Publication Data
US 2021/0370865 A1    Dec. 2, 2021

(30) Foreign Application Priority Data

May 26, 2020   (DE) ..................... 10 2020 114 110.6
May 12, 2021   (DE) ..................... 10 2021 112 446.8

(51) Int. Cl.
*B60R 22/46*    (2006.01)

(52) U.S. Cl.
CPC ...... *B60R 22/4628* (2013.01); *B60R 22/4671* (2013.01)

(58) Field of Classification Search
CPC . B60R 22/46; B60R 22/4628; B60R 22/4633; B60R 22/4671; B60R 2022/4647
See application file for complete search history.

(56) References Cited

U.S. PATENT DOCUMENTS

| 4,444,010 | A | 4/1984 | Bendler |
| 8,042,835 | B2 | 10/2011 | Bieg |
| 9,908,503 | B2 * | 3/2018 | Gentner ................. B60R 22/34 |
| 2007/0241550 | A1 * | 10/2007 | Bieg ................... B60R 22/4628 297/480 |

FOREIGN PATENT DOCUMENTS

| DE | 10231268 A1 | 1/2004 |
| DE | 102006031359 | 10/2007 |
| DE | 102006031360 | 10/2007 |
| JP | H08192722 A | 7/1996 |
| WO | WO-2012143090 A1 | 10/2012 |

* cited by examiner

*Primary Examiner* — Sang K Kim
(74) *Attorney, Agent, or Firm* — THOMPSON HINE LLP

(57) ABSTRACT

A force transfer element for an apparatus for belt tightening is provided, wherein the force transfer element is a rod-shaped body that is essentially structured over its total length and/or is formed from at least a first and a second part.

10 Claims, 3 Drawing Sheets

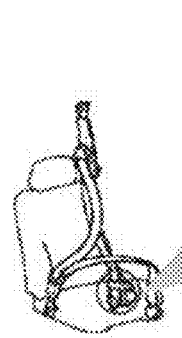
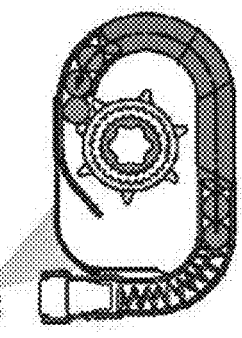
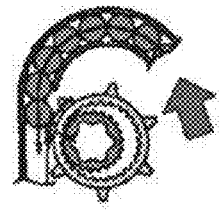
FIG. 1A
(Prior Art)
FIG. 1B
(Prior Art)
FIG. 1C
(Prior Art)
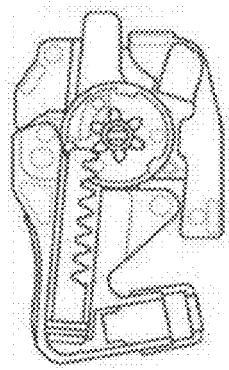
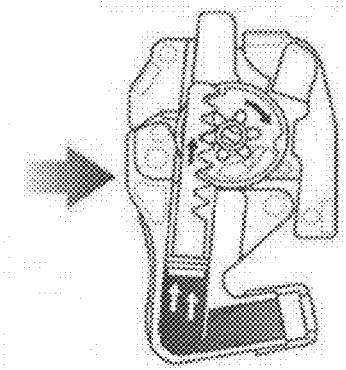
FIG. 2A
(Prior Art)
FIG. 2B
(Prior Art)
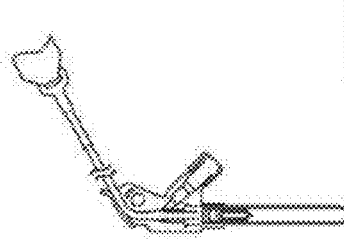
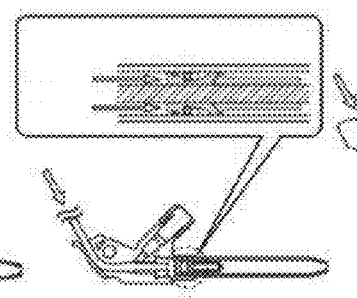
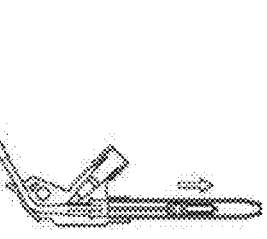
FIG. 3A
(Prior Art)
FIG. 3B
(Prior Art)
FIG. 3C
(Prior Art)

FORCE TRANSMISSION ELEMENT FOR A DEVICE FOR BELT TENSIONING AND A DEVICE FOR BELT TENSIONING WITH SUCH A FORCE TRANSMISSION ELEMENT

TECHNICAL FIELD

The present invention relates to a force transfer element for an apparatus for belt tightening and an apparatus for belt tightening having such a force transfer element.

An apparatus for belt tightening or a belt tightener belongs, like airbags, to the so-called passive safety system of a vehicle. Its task is to tighten the seatbelts in an accident so that the vehicle occupant participates in the total delay of the vehicle at an earlier point in time. For this purpose, the belt is retracted by up to 15 cm within approximately 10 to 15 milliseconds.

The belt tightener can be integrated within the belt retractor, below the belt buckle, and/or on the anchoring of the belt. Either a tensioned spring (spring force) or a small explosive charge (gas pressure) is used as the energy supplier.

When used properly, current belt tighteners apply approximately 2 kN of force to the shoulder when the belt has already been tightly fastened. When used properly, this only results in injuries in exceptional circumstances. The so-called belt force limiter was developed in order to prevent the forces from increasing too much after the belt has been tightened in the forward displacement phase of the occupant.

The airbag control unit triggers the belt tightener when it receives information about a collision via the sensor system. The triggering threshold can be lower than that of the airbag, for example at low speed. It can therefore happen that the seat belt tightener is triggered, but the airbag is not. In modern cars, sensors additionally check whether someone is in the seat and the belt is fastened. If this is not the case, the triggering does not occur.

There are several designs of belt tighteners.

Rotational tighteners are relatively common (FIGS. 1A to 1C). The control unit triggers a pyrotechnic propellant charge in the belt retractor, the gas pressure of which accelerates steel balls in the retractor. The latter deliver their kinetic energy to a gearwheel on the shaft of the belt retractor. The rotation of the gearwheel continues to roll up the belt, which then rests tightly against the passenger. In the belt buckle design, the gas pressure of the propellant charge is delivered to a piston under the seat, which abruptly pulls the belt buckle rearward-downward via a steel cable, thus tightening the belt.

Other functionalities are, for example (FIGS. 2A to 5): Cable tightener, tube tightener, and Wankel tightener (a circular piston motor similar to the Wankel motor). Instead of a pyrotechnical propellant charge, a tensioned spring can also apply the necessary force.

A modern but comparatively expensive design is the reversible belt tightener. In addition to the pyrotechnical belt tightener, an electric drive is used, which can tighten the belt at a lower force (for example 100-200 N). Due to its multiple usability, the reversible belt tightener can be used during a hazardous situation without an actual accident needing to occur.

In belt tighteners known from the prior art, in which a force transfer element is configured in order to apply a load on an actuating element made of metal balls, it is disadvantageous that the latter causes disturbing noises when using a corresponding motor vehicle, in particular when the vehicle is equipped with an electric engine, due to a bouncing of the metal balls off of one another (so-called rattling noises).

The metal balls also have a relatively high dead weight. Such metal balls are also relatively costly to manufacture.

Furthermore, metal balls as force transfer elements are often elaborate in synchronization with a corresponding actuating element. That is to say, the individual metal balls must be tuned to and synchronized with respective actuating regions of an actuating element.

Force transfer elements are disclosed, for example, in U.S. Pat. No. 8,042,835B2, DE 10 2006 031 359, and DE 10 2006 031 360.

From JP H08-192 722 A, a belt tightener for a seatbelt system is known, which comprises a pyrotechnic drive as a drive unit and a force transfer element. The force transfer element engages with a rotatably supported drive wheel coupled to the axis of a belt retractor after an activation of the drive unit. In addition, the belt tightener can comprise a curved guide for the force transfer element, said guide being configured at least in sections as a pressure chamber.

U.S. Pat. No. 4,444,010 A discloses a belt tightener comprising a large number of force transfer elements, e.g. balls. The drive of the drive wheel by the force transfer elements is accomplished by frictional engagement.

Furthermore, a ball tightener is disclosed in DE 102 31 268 A1. In this case, the channel through which the pressure transfer elements are fed to the drive wheel in the form of the balls is configured such that at least one of the balls acts as a sealed piston against the channel wall.

SUMMARY

The problem of the present invention is to provide a force transfer element for an apparatus for belt tightening as well as an apparatus for belt tightening having such a force transfer element, which provide an alternative to the force transfer elements known from the prior art.

A further problem of the present invention is to provide a force transfer element that is safe and reliable in operation.

In addition, a force transfer element is to be provided that is lighter and more inexpensively manufactured compared to force transfer elements known from the prior art.

One or more of these problems is solved by the apparatuses defined in independent claims 1 and 8. Advantageous configurations thereof are specified in the dependent claims.

According to the invention, a force transfer element for an apparatus for belt tightening is provided, wherein the force transfer element is a rod-shaped body, which is essentially structured over its total length and/or is formed from at least a first and a second part.

The inventors of the present invention have recognized that in the manufacture of a force transfer element which is configured as a rod-shaped body and which preferably has a constant cross-section, it can happen that bubbles, cavities, vacuoles, or gas pockets occur during injection molding due to the cooling process of the elongated rod-shaped body with a constant cross-section, in particular at a casing wall of the rod-shaped body.

This is because this injection cross-section solidifies before the melt core (plastic core) solidifies. The shrinkage-related volume adjustment caused by the cooling of the melt can no longer be influenced by the melting pressure in such an elongated component. The lack of pressure leads to free shrinkage and thus the formation of cavities and/or vacuoles in the core of the component. The provision of a plurality of injection points is also not technically possible in production.

In addition, during injection molding it must be ensured that a wider cross-section is provided on the rod-shaped body at the beginning of the extrusion process, whereas at the end of the extrusion process the rod-shaped body must have a smaller cross-section.

Due to the fact that the force transfer element can be formed from a first and a second part, the total length of the rod-shaped body is reduced so that it can be manufactured by means of an extrusion process.

Due to the fact that the rod-shaped body can be structured essentially over its total length in the axial direction, the body can also be manufactured by means of an injection molding process.

Corresponding sliding tools are provided here (FIG. 8), which form structuring that extends essentially over the total length of the rod-shaped body. The structuring/structure is provided/formed in the form of corresponding grooves, ridges, interstices, recesses, or ribs that extend essentially over the total length in the axial direction of the rod-shaped body.

The essential total length of the rod-shaped body in the axial direction can be understood in the context of the present invention to mean at least 50% or 60% or 70% or 80% or 90% or about 100% of the total length of the rod-shaped body in the axial direction.

The structures or corresponding recesses and/or ridges are preferably formed rotationally symmetrically along a casing wall of the rod-shaped body and in the casing wall of the rod-shaped body.

Due to the fact that the force transfer element is formed from a plastic, the component is relatively light and can also be manufactured inexpensively.

The two parts can be formed from the same plastic or from at least two different plastics.

Plastics suitable for this purpose are, for example, polymers or polyoxymethylene (POM), polyamide (PA) with or without glass fibers, elastomers, and the like.

The at least two parts forming the rod-shaped body each have a connecting surface, wherein the connecting surface extends transversely to an axial direction or is inclined at a predetermined angle to the longitudinal direction of the rod-shaped body and wherein the connecting surfaces each have correspondingly configured connecting means for connecting the first and the second part, which are configured as connecting recesses and/or connecting elements, and wherein regions are preferably formed in the connecting region between the connecting elements and the connecting recesses in the form of undercuts.

When connecting the two parts by means of extrusion (or injection molding), it can occur that it is not possible to establish a material-locking connection between the two parts in the connecting region or in the region of the connecting surface. Due to the fact that corresponding connecting recesses and connecting elements are provided and preferably have corresponding undercuts, the two parts that form the rod-shaped body are connectable to one another in a friction-locking fashion.

The rod-shaped body can thus be manufactured by an extrusion or injection molding process.

The rod-shaped body can transfer force to an actuating element of an apparatus for belt tightening via one of its end faces, which then forms a force transfer surface and correspondingly has a predetermined rigidity in the longitudinal direction.

Additionally and/or alternatively, the rod-shaped body can transfer a force to an actuating element of an apparatus for belt tightening via its casing wall, wherein the casing wall is elastically or plastically deformable at least in one force transfer region that forms a force transfer surface and/or has corresponding actuating recesses, which extend approximately transversely to the longitudinal direction of the rod-shaped body.

By the aforementioned means, a safe and reliable transfer of a force from the force transfer element to an actuating element of an apparatus for belt tightening is possible.

The force transfer region can be a radial section of the rod-shaped body, wherein this region is deformable to about 90% or 80% or 70% or 60% or [5]0% or 40% or 30% or 20% to 10% of the diameter of the rod-shaped body. The aforementioned percentage information also describes a penetration depth of an actuating element into the cross-section of the rod-shaped body.

Furthermore, an apparatus for belt tightening is provided, having a force transfer element as described above. This comprises a belt retractor, which is displaceable with an actuating element in a rotational movement such that a seatbelt is retracted and/or tightened, wherein the actuating element is actuated by means of the force transfer element.

Alternatively, instead of a belt retractor, a displacement, in particular a linear displacement of a belt buckle, can also be provided in the apparatus for belt tightening. The displacement can then also be effected by means of a force transfer element according to the invention.

The actuating element of the belt retractor can be part of a rotatably supported drive wheel or gear-like wheel (gearwheel) coupled or coupleable to an axis of a belt retractor, wherein the force transfer element contacts the actuating element in a force transfer region such that the belt retractor is displaceable in a rotational movement such that the seatbelt is retractable and tightenable.

Furthermore, according to the invention, a method is provided for manufacturing a force transfer element 1 as described above.

Preferably, the force transfer element 1 is manufactured from a plastic material by means of an injection molding process.

Alternatively, the force transfer element can also be manufactured from two or more different plastics by means of a 2-component or multi-component injection molding process.

In addition, it is also conceivable according to the invention to manufacture the force transfer element by means of an extrusion process.

Co-extrusion is also possible for manufacturing the force transfer element.

BRIEF DESCRIPTION OF THE DRAWINGS

The present invention will now be described using exemplary embodiments shown in the figures. The figures show:

FIGS. 1A to 1C, schematic illustrations of a belt tightener known from the prior art, FIGS. 2A and 2B, a further schematic illustration of a belt tightener known from the prior art, FIGS. 3A to 3C, a further schematic illustration of a belt tightener known from the prior art, FIG. 4, a perspective illustration of a further belt tightener known from the prior art, FIG. 5, a laterally sectioned illustration of a further belt tightener known from the prior art, FIG. 6, a perspective illustration of a first embodiment of a rod-shaped force transfer element for a belt tightener according to the invention, FIG. 7, a lateral view of the force transfer element from FIG. 6, FIG. 8, a front view of the rod-shaped force transfer element with two tool sliders shown schematically, FIG. 9, a schematic, laterally sectioned illustration of a further embodiment of the rod-shaped force transfer element, and FIG. 10, a further laterally sectioned illustration of an embodiment of the rod-shaped force transfer element.

DETAILED DESCRIPTION

Figure 4:
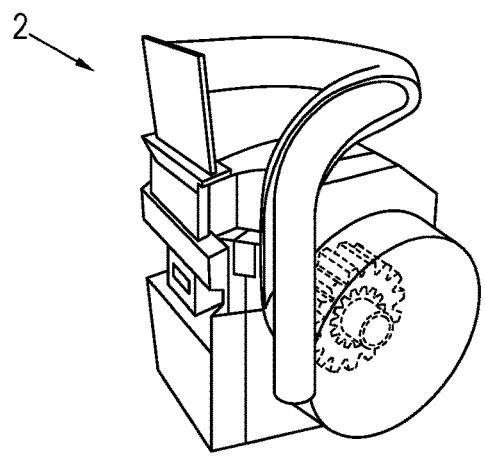

A force transfer element 1 according to the invention for an apparatus for belt tightening 2 is essentially cylindrical and extends in an axial direction 3.

The force transfer element 1 comprises two end walls as well as a casing wall connecting the two end walls (FIGS. 6 to 10).

One of the two end walls 4, 5 can be loaded by means of gas pressure and/or spring force of a belt tightener 2. This end wall 4 is preferably configured as a continuous, circular, disk-shaped surface, which does not have any recesses and forms a force loading wall.

According to a first embodiment, the total casing wall 6 is enclosed in continuous axial ribs 7 (ridges) extending in the axial or longitudinal direction 3 of the rod-shaped force transfer element 1.

The axial ribs 7 are preferably arranged at a 90° angle or perpendicular to one another.

The longitudinally extending axial ribs 7 can also be discontinuous and thus have grooves (not shown).

Transverse ribs 8 (ridges) extending transversely or orthogonally to the axial direction 3 are further provided, which connect the axial ribs 7 extending in the axial direction 3 to one another. The transverse ribs 8 are preferably arranged equidistant to one another in the longitudinal direction.

According to this exemplary embodiment, four main axial ribs 9 are arranged cross-sectionally in a cross shape, wherein a respective secondary axial rib 9 is arranged at a right angle to each of the main axial ribs 9.

Figure 8:
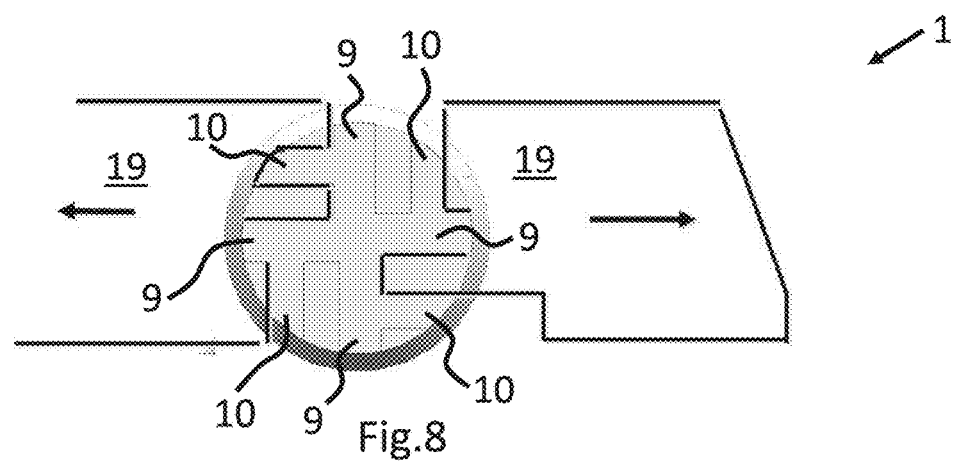

The corresponding ribs 7, 8, 9, 10 (ridges) extending in the axial direction 3 and transverse to the axial direction 3 in a rod-shaped force transfer element 1 or body according to this exemplary embodiment are formed in an injection molding process by means of corresponding tool sliders (FIG. 8).

The end wall 5, which cannot be loaded by means of gas pressure and/or spring force, can also have recesses 11 that are configured correspondingly to the axial ribs 7 due to the manufacturing process. The recesses 11 are also arranged at right angles to one another.

The end wall 5 or the casing wall 6 form either a force transfer wall 11 [sic], depending on whether the force is transferred via the end wall 5 or the casing wall 6.

Such a rod-shaped body transfers its translatory movement to a rotatably supported drive wheel of a belt retractor or an apparatus for belt retraction 2 or to a gearwheel of a belt retractor, so that these are displaced in a rotational movement.

This can preferably be accomplished by elastic but also by plastic deformation of the force transfer wall 12, which is configured as the casing wall 6, of the rod-shaped body and the force transfer element 1, respectively.

In addition and/or alternatively, corresponding recesses, in particular actuating recesses (not shown), extending in the radial direction and approximately corresponding to the respective teeth of the gear-like wheel can be provided. These actuating recesses are formed at least partially or completely radially circumferentially in the casing wall 6 and extend orthogonally to the axial direction 3 and are arranged equidistant to one another in order to actuate a corresponding gearwheel.

Figure 9:
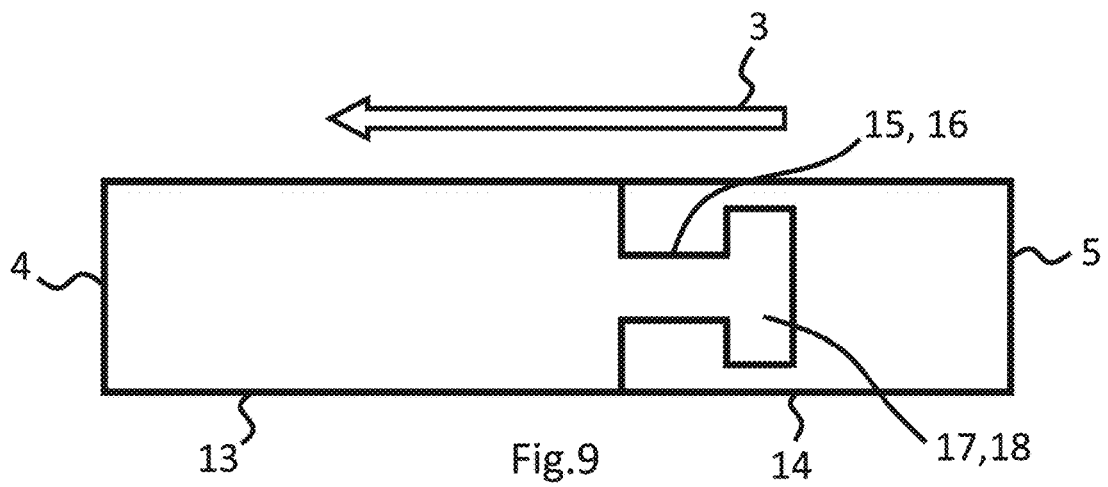
Figure 10:
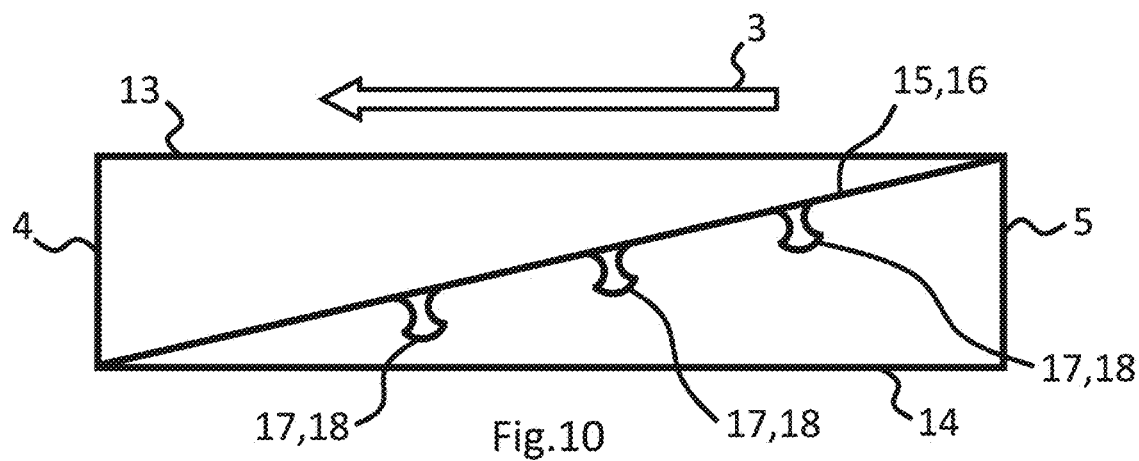

According to an alternative embodiment, the rod-shaped body or force transfer element 1 is configured in two parts (FIGS. 9 and 10).

Here, it can be provided that a first and a second part 13, 14 of the rod-shaped body 1 are made of one and the same or of two different plastics.

The first and second parts 13, 14 each have a first and a second connecting surface 15, 16 in a front-facing section.

According to an exemplary embodiment, the connecting surface 15 extends transversely or orthogonally to the axial direction 3 of the rod-shaped body 1 (FIG. 9). In the region of the connecting surface of the first rod-shaped body, an approximately mushroom-shaped connecting element 17 is integrally formed.

The second part 14 of the rod-shaped body 1 has a connecting recess 18 formed correspondingly to the connecting element 17 of the first part 13 of the rod-shaped body 1.

Preferably, the first and second parts 13, 14 are manufactured in a single injection molding process together with the connecting element 17 and the connecting recess 18.

Both parts can be made of the same plastic. Alternatively, such a force transfer element can also be manufactured in a 2-component injection molding process from two different plastics.

Alternatively, initially the first and subsequently the second part of the rod-shaped body 1 can also be manufactured by means of an extrusion process.

A further embodiment of a rod-shaped body formed from a first and a second part is shown in FIG. 10.

The connecting surfaces 15, 16 of the first and the second parts 13, 14 are inclined opposite to the axial and longitudinal direction 3 of the force transfer element 1 (rod-shaped body). Preferably, the first and second parts 13, 14 of the rod-shaped body 1 have a plurality of connecting elements 17 and a plurality of connecting recesses 18, which are formed corresponding to one another.

The rod-shaped body 1 according to this embodiment can also be manufactured by means of an extrusion process or an injection molding process, wherein first or second part 13, 14 are initially formed and subsequently the second or first part, respectively.

In addition, according to the invention, an apparatus for belt tightening 2 is provided, which comprises a force transfer element according to the invention. The force transfer element 1 is thus also suitable for apparatuses for belt tightening 2 that are known from the prior art and partially shown in FIGS. 1A to 3C.

Known belt tighteners 2 typically have a force transfer element, for example, a plurality of balls arranged in a row, which are initially stored in a tube and subjected to high pressure upon activation of a gas generator (FIGS. 1A to 1C).

In doing so, the balls are pushed forward out of the tube and drive a drive wheel, which is coupled to the belt reel.

Further force transfer elements used in known belt tighteners are racks, tracks, moldings, or even the compressed gas itself, which is produced by a gas generator (Figures).

Such force transfer elements can be replaced with a correspondingly configured force transfer element 1 according to the invention.

Figure 5:
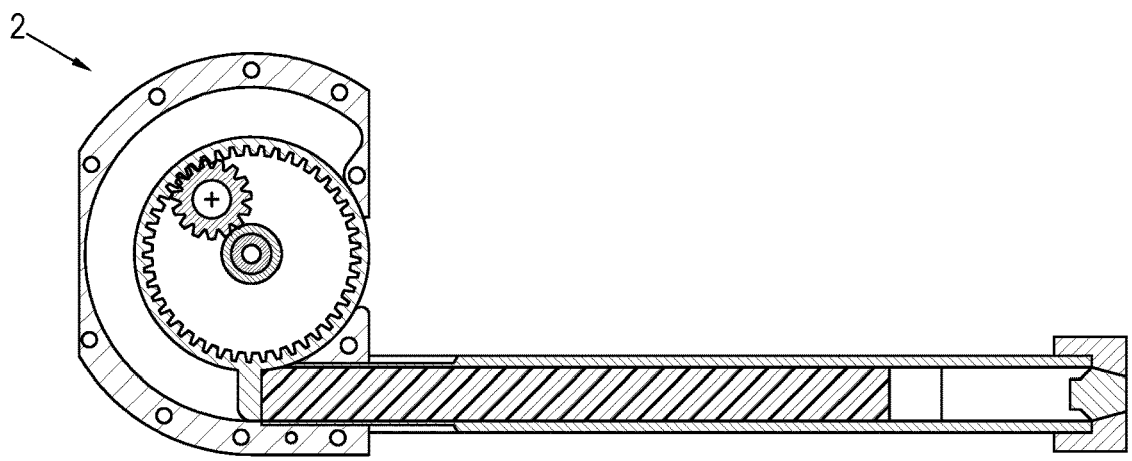
Figure 6:
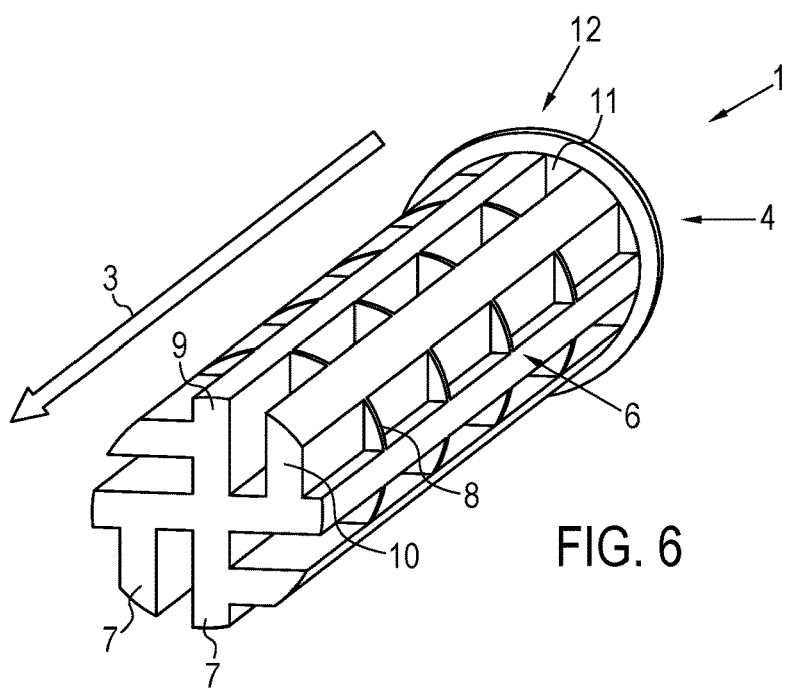
Figure 7:
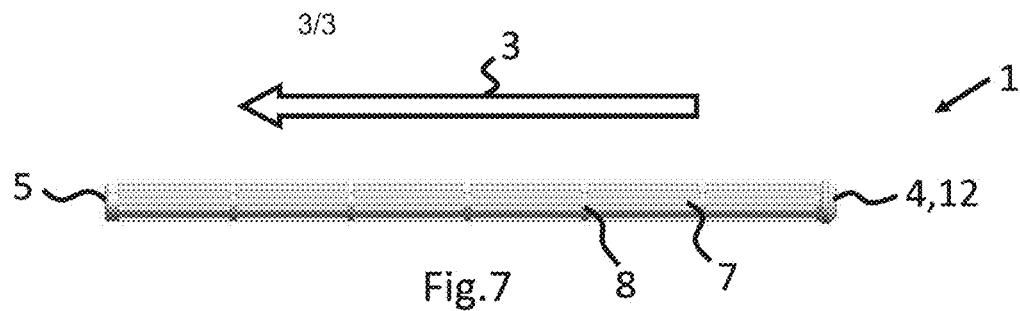

The force transfer element 1 can be formed from an elastically or plastically deformable material, wherein the material is preferably elastically configured in order to conform to the course of a curved guide of an apparatus for belt tightening 2, and wherein the drive wheel penetrates the material of the force transfer element upon activation of the drive unit (FIGS. 4 and 5).

A deformable material is to be understood to mean a material that macroscopically deforms upon contact with the drive wheel, for example. Examples of this are EPDM materials of various Shore hardness (70-95 Shore), rubber, natural rubber, or (soft) thermoplastics.

Furthermore, according to the invention, a method is provided for manufacturing a force transfer element 1 as described above.

Preferably, the force transfer element 1 is manufactured from a plastic material by means of an injection molding process.

Alternatively, the force transfer element can also be manufactured from two or more different plastics by means of a 2-component or multi-component injection molding process.

Here, a plastic is liquefied (plasticized) with an injection molding machine and injected under pressure into a mold, the injection molding tool. In the tool, the material returns to the solid state by cooling or by a cross-linking reaction and is removed as a finished part after opening the tool. The cavity of the tool determines the shape and surface structure of the finished part.

Furthermore, sliding tools 19 are provided in order to form a corresponding structure or the ribs in the casing wall 6.

In addition, it is also conceivable according to the invention to manufacture the force transfer element by means of an extrusion process.

During the extrusion, a thick, curable plastic compound is continuously squeezed out of a shape-defining opening (also referred to as a nozzle, die, or mouthpiece) under pressure. A force transfer element is then created having a structure corresponding to the cross-section of the opening.

Co-extrusion is also possible for manufacturing the force transfer element.

LIST OF REFERENCE NUMERALS

1 Force transfer element
2 Apparatus for belt tightening
3 Axial direction
4 End wall
5 End wall
6 Casing wall
7 Axial rib
8 Transverse rib
9 Main axial rib
10 Secondary axial rib
11 Recess
12 Force transfer wall
13 First part
14 Second part
15 Connecting surface
16 Connecting surface
17 Connecting element
18 Connecting recess
19 Sliding tool

What is claimed is:

1. A force transfer element for an apparatus for belt tightening, wherein the force transfer element:

is a rod-shaped body formed from a plastic, which is structured over its total length, wherein the rod-shaped body includes axial ribs extending in an axial direction of the rod-shaped body and transverse ribs extending transversely to the axial direction and interconnecting the axial ribs; and is formed from at least a first part and a second part, wherein the first part and the second part each include a connecting surface that extends transversely to the axial direction or is inclined at a predetermined angle to the axial direction, and wherein the connecting surfaces of the first part and the second part have matingly engaged connecting portions, the connecting portions including at least one connecting element and at least one connecting recess in which the connecting element is engaged, wherein the connecting element and the connecting recess are configured such that undercuts of the connecting recess retain the connecting element in the connecting recess.

2. The force transfer element according to claim 1, wherein
the axial ribs are arranged rotationally symmetrically and are formed in a casing wall of the rod-shaped body.

3. The force transfer element according to claim 1, wherein
the first part is formed from a plastic that is different from a plastic from which the second part is formed.

4. The force transfer element according to claim 1, wherein
the rod-shaped body is made from a plastic by an extrusion or injection molding process.

5. The force transfer element according to claim 1, wherein
the rod-shaped body includes an end face that forms a force transfer surface and has a predetermined rigidity in the axial direction, or includes a casing wall and the casing wall has at least in one force transfer region a force transfer surface, which is elastically or plastically deformable and/or has corresponding actuating recesses, which extend approximately transversely to the axial direction of the rod-shaped body.

6. An apparatus for belt tightening with the force transfer element according to claim 1, comprising: a belt retractor, which is displaceable with an actuating element in a rotational movement such that a seatbelt is retracted or tightened, wherein the actuating element is actuatable by the force transfer element.

7. The apparatus according to claim 6, wherein
that the force transfer element has a continuous end wall, which can be loaded by gas pressure and/or spring force, wherein a different end wall is structured or formed continuously.

8. The apparatus according to claim 6, wherein
the actuating element of the belt retractor is part of a rotatably supported drive wheel or gear wheel coupled or coupleable to an axis of a belt retractor, and wherein the force transfer element contacts the actuating element in a force transfer region such that the belt retractor is displaceable in a rotational movement such that the seatbelt is retractable and tightenable.

9. A method of manufacturing a force transfer element according to claim 1, wherein the force transfer element is manufactured by a single-component or multi-component injection molding process or by means of an extrusion process.

10. A force transfer element for an apparatus for belt tightening, wherein the force transfer element is formed from at least a first part and a second part, wherein the first part and the second part each include a connecting surface that extends transversely to an axial direction of the force transfer element or is inclined at a predetermined angle to the axial direction, and wherein the connecting surfaces of the first part and the second part have matingly engaged connecting portions, the connecting portions including at least one connecting element projection and at least one connecting recess in which the connecting element projection is engaged, wherein the connecting element projection and the connecting recess are configured such that undercuts of the connecting recess retain the connecting element projection in the connecting recess.

\* \* \* \* \*